US008693459B2

(12) United States Patent
Youn et al.

(10) Patent No.: US 8,693,459 B2
(45) Date of Patent: Apr. 8, 2014

(54) POLARIZATION DIVISION MULTIPLEXED OPTICAL ORTHOGONAL FREQUENCY DIVISION MULTIPLEXING TRANSMITTER AND RECEIVER

(75) Inventors: Chun Ju Youn, Daejeon (KR); Yong-Hwan Kwon, Daejeon (KR); Jong-Hoi Kim, Daejeon (KR); Joong-Seon Choe, Daejeon (KR); Kwang-Seong Choi, Daejeon (KR); Kyoungwoo Heo, Gyeongsanbuk-Do (KR); Eun Soo Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 529 days.

(21) Appl. No.: 12/772,350

(22) Filed: May 3, 2010

(65) Prior Publication Data

US 2011/0096855 A1 Apr. 28, 2011

(30) Foreign Application Priority Data

Oct. 23, 2009 (KR) .......................... 10-2009-0101134

(51) Int. Cl.
*H04J 3/06* (2006.01)

(52) U.S. Cl.
USPC .......................................................... 370/350

(58) Field of Classification Search
None
See application file for complete search history.

(56) References Cited

U.S. PATENT DOCUMENTS

| 6,201,785 | B1 * | 3/2001 | Fouche et al. ................. 370/203 |
| 7,403,570 | B2 | 7/2008 | Ma et al. | |
| 8,204,377 | B2 * | 6/2012 | Liu et al. ......................... 398/65 |
| 8,218,979 | B2 * | 7/2012 | Liu ................................. 398/208 |
| 2001/0050926 | A1 * | 12/2001 | Kumar .......................... 370/529 |
| 2004/0105512 | A1 * | 6/2004 | Priotti ........................... 375/340 |
| 2004/0165650 | A1 * | 8/2004 | Miyazaki et al. ............. 375/141 |
| 2009/0147873 | A1 * | 6/2009 | Li et al. ......................... 375/260 |
| 2009/0202243 | A1 * | 8/2009 | Qian et al. ...................... 398/65 |

(Continued)

FOREIGN PATENT DOCUMENTS

| EP | 2071754 A1 | 6/2009 |
| KR | 1020070009366 A | 1/2007 |
| KR | 10-2010-0029709 A | 3/2010 |

OTHER PUBLICATIONS

Sander L. Jansen et al., "Long-haul transmission of 16×52.5 Gbits/s polarization-division-multiplexed OFDM enabled by MIMO processing (Invited)" Journal of Optical Networking, vol. 7, No. 2, pp. 173-182, Feb. 2008.

(Continued)

*Primary Examiner* — Hassan Phillips
*Assistant Examiner* — Prenell Jones
(74) *Attorney, Agent, or Firm* — Rabin & Berdo, P.C.

(57) ABSTRACT

Provided is a polarization division multiplexed optical OFDM transmitter. The polarization division multiplexed optical OFDM transmitter includes a data demultiplexer, a training symbol generation unit and an optical up-converter and polarization division multiplexing unit. The data demultiplexer divides a transmission signal into a plurality of groups. The training symbol generation unit allocates a plurality of training symbols for each OFDM data which is included in the respective multiplexed groups, and allocates repetitive data in a time domain for the respective training symbols for data of 0 to periodically appear for the respective training symbols in a frequency domain. The optical up-converter and polarization division multiplexing unit performs optical frequency band conversion and polarization division multiplexing on an output of the training symbol generation unit to output a polarization division multiplexed optical OFDM signal corresponding to a plurality of polarization components.

9 Claims, 6 Drawing Sheets

(56) References Cited

U.S. PATENT DOCUMENTS

| | | | |
|---|---|---|---|
| 2009/0324223 A1* | 12/2009 | Liu | 398/65 |
| 2009/0324226 A1* | 12/2009 | Buchali et al. | 398/76 |
| 2010/0021163 A1* | 1/2010 | Shieh | 398/65 |
| 2010/0061398 A1* | 3/2010 | Stadelmeier et al. | 370/465 |
| 2010/0178056 A1* | 7/2010 | Liu | 398/65 |
| 2010/0329683 A1* | 12/2010 | Liu | 398/81 |
| 2011/0002689 A1* | 1/2011 | Sano et al. | 398/44 |

OTHER PUBLICATIONS

Xiang Liu et al., "A Novel Channel Estimation Method for PDM-OFDM Enabling Improved Tolerance to WDM Nonlinearity" Optical Fiber Communication, pp. OWW5.1-3, 2009.

* cited by examiner

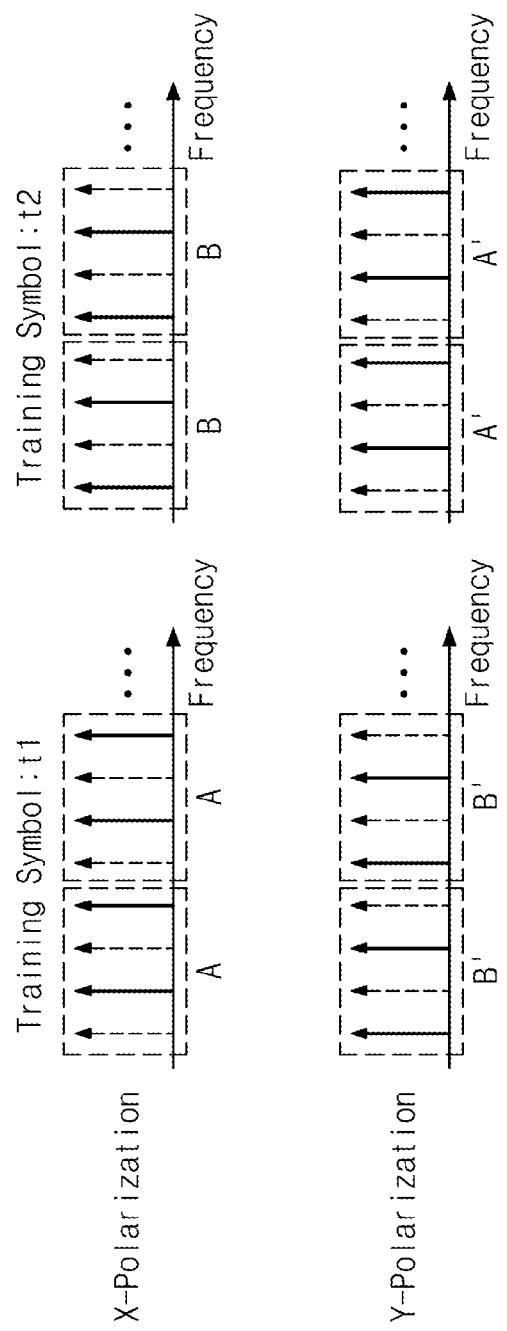

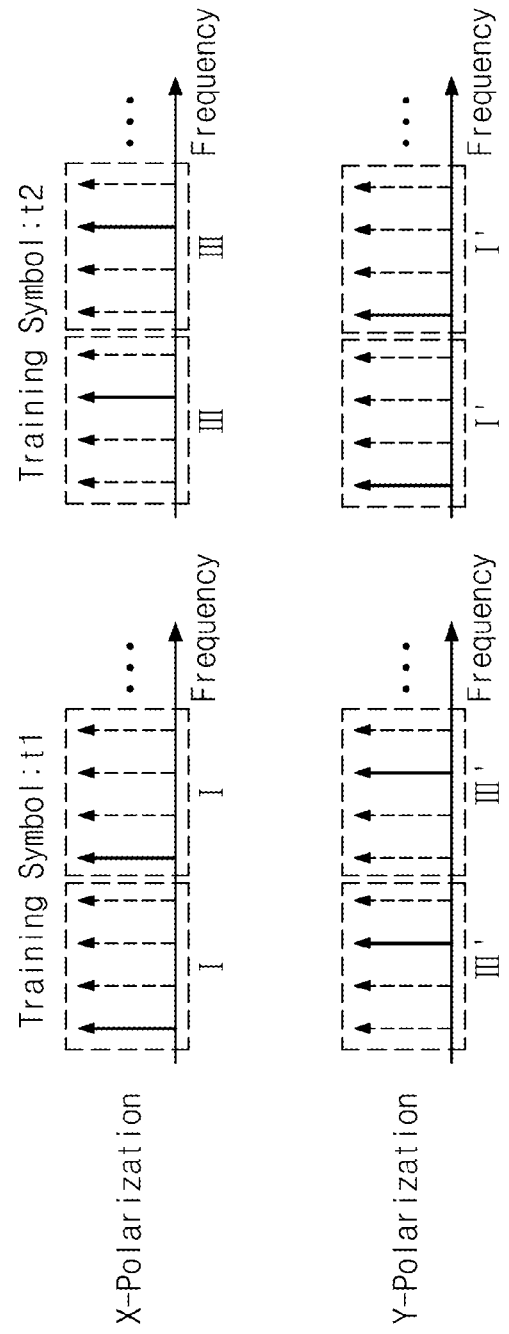

POLARIZATION DIVISION MULTIPLEXED OPTICAL ORTHOGONAL FREQUENCY DIVISION MULTIPLEXING TRANSMITTER AND RECEIVER

CROSS-REFERENCE TO RELATED APPLICATIONS

This U.S. non-provisional patent application claims priority under 35 U.S.C. §119 of Korean Patent Application No. 10-2009-0101134, filed on Oct. 23, 2009, the entire contents of which are hereby incorporated by reference.

BACKGROUND OF THE INVENTION

The present invention disclosed herein relates to a communication apparatus, and more particularly, to a polarization division multiplexed optical Orthogonal Frequency Division Multiplexing (OFDM) transmitter and receiver.

OFDM is a communication system that allocates a wide band signal to a plurality of vertical subcarriers having a narrow interval, and modulates and transmits each of the subcarriers at a relatively low symbol speed. As technology capable of coping with high spectrum efficiency and a multiplexing fading effect, an OFDM communication technology is much used in Worldwide Interoperability for Microwave Access (WiMAX), wireless Local Area Network (LAN), Asymmetric Digital Subscriber Line (ADSL), a digital radio and a video broadcasting system.

Recently, research is actively being made on optical OFDM that applies an optical communication technology to OFDM. An optical OFDM technology is recognized as technology having a large allowable value for a factor that deteriorates the quality of an optical signal like the chromatic dispersion of an optical fiber and polarization mode dispersion. As a method for increasing the transmission speed of an optical signal, a polarization multiplexing technology is being applied. The polarization multiplexing technology is one that multiplexes an optical signal into two polarization components (for example, x-polarization and y-polarization) within a bandwidth for increasing a signal transmission speed, thereby transmitting the multiplexed polarization components. As described above, a case of applying an optical communication technology and a polarization multiplexing technology to OFDM is called polarization division multiplexed optical OFDM.

A polarization division multiplexed optical OFDM technology is one requiring an operation that estimates and synchronizes the characteristics of channels for each polarization. As such a technology, various types of channel estimation methods and synchronization methods have been proposed. However, the currently-proposed channel estimation method and synchronization method of the polarization division multiplexed optical OFDM have characteristic for only a channel estimation function or synchronization. Accordingly, polarization division multiplexed optical OFDM having characteristic for both a channel estimation function and synchronization is required.

SUMMARY OF THE INVENTION

The present invention provides a polarization division multiplexed optical OFDM transmitter and receiver, which can effectively perform channel estimation and synchronization.

The present invention also provides a polarization division multiplexed optical OFDM transmitter and receiver, which can improve an allowable value for a nonlinear effect.

Embodiments of the present invention provide a polarization division multiplexed optical OFDM transmitter including: a data demultiplexer dividing a transmission signal into a plurality of groups; a training symbol generation unit allocating a plurality of training symbols for each OFDM data which is included in the respective multiplexed groups, and allocating repetitive data in a time domain for the respective training symbols for data of 0 to periodically appear for the respective training symbols in a frequency domain; and an optical upconverter and polarization division multiplexing unit performing optical frequency band conversion and polarization division multiplexing on an output of the training symbol generation unit to output a polarization division multiplexed optical OFDM signal corresponding to a plurality of polarization components.

In some embodiments, the training symbol generation unit may allocate at least two training symbols for each OFDM data which is respectively included in first and second groups, and allocate data to subcarriers in different locations of the at least two allocated training symbols.

In other embodiments, the training symbol generation unit may allocate first and second training symbols to the respective OFDM data of the first group, allocate third and fourth training symbols to the respective OFDM data of the second group, allocate first data to the same subcarrier location of the first and third training symbols, and allocate second data to the same subcarrier location of the second and fourth training symbols.

In still other embodiments, the first data may differ from the second data.

In even other embodiments, the training symbol generation unit may allocate the plurality of training symbols for an empty space not to exist on a time axis for each of the multiplexed groups.

In other embodiments of the present invention, a polarization division multiplexed optical OFDM receiver includes: a synchronization unit performing symbol time synchronization and frequency synchronization using a plurality of training symbols which respectively correspond to a plurality of polarization components included in a received polarization division multiplexed optical OFDM signal; a channel estimation and equalization unit performing channel estimation and signal distortion compensation on the basis of the plurality of training symbols which respectively correspond to the plurality of polarization components; and a data multiplexer combining binary demodulation results of an output of the channel estimation and equalization unit into an original signal.

In some embodiments, the plurality of training symbols corresponding to the respective polarization components may include data of 0 which periodically appears in a frequency domain.

In other embodiments, the synchronization unit may perform the symbol time synchronization and the frequency synchronization using the data of 0 which periodically appears.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures:

FIG. 3 is a diagram illustrating the structure of training symbols in a frequency domain according to an embodiment of the present invention;

FIGS. 4A and 4B are diagrams illustrating the structures of training symbols in a frequency domain according to another embodiment of the present invention.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

A polarization division multiplexed optical OFDM transmitter according to embodiments of the present invention may allocates continuous training symbols for OFDM data corresponding to each of two multiplexed polarization components (for example, x-polarization and y-polarization). By allocating data for each of the training symbols in a time domain, the transmitter cannot have an empty time interval. As a result, power difference between adjacent training symbols decreases and thus an allowable value by a nonlinear effect can be improved, enabling effective synchronization. Moreover, a polarization division multiplexed optical OFDM receiver according to embodiments of the present invention configures a polarization multiplexing training symbol by using characteristic in which data of 0 appears periodically and repeatedly in a frequency domain in the case of a training symbol having a structure that is repeated in a time domain. Consequently, the polarization division multiplexed optical OFDM receiver according to embodiments of the present invention can perform channel estimation and synchronization by using a polarization multiplexing training symbol according to embodiments of the present invention.

Figure 1:
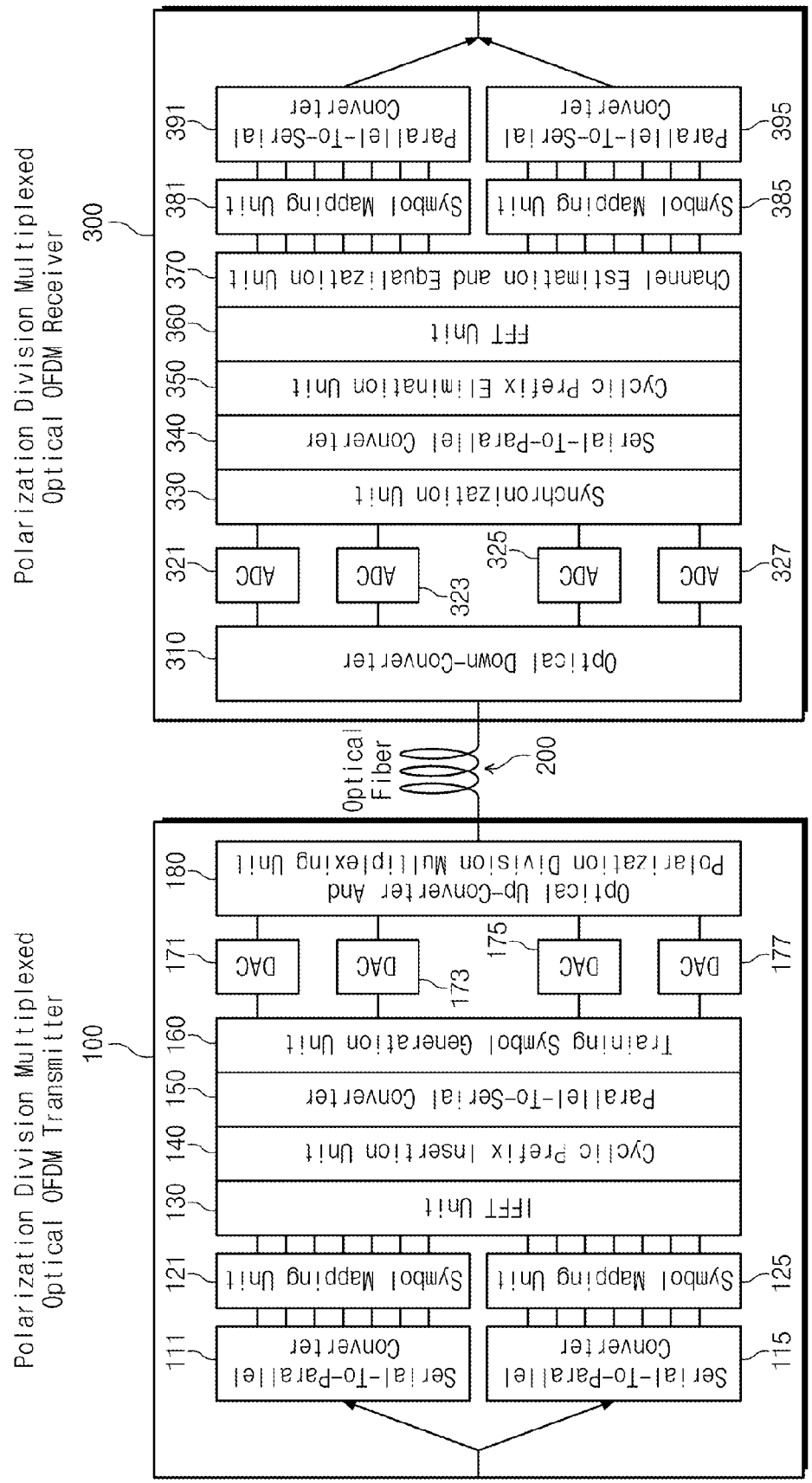
FIG. 1 is a diagram illustrating the entire configuration of a polarization division multiplexed optical OFDM system according to an embodiment of the present invention.

FIG. 1 is a diagram illustrating the entire configuration of a polarization division multiplexed optical OFDM system according to an embodiment of the present invention.

Referring to FIG. 1, a polarization division multiplexed optical OFDM system according to an embodiment of the present invention includes a polarization division multiplexed optical OFDM transmitter 100 and a polarization division multiplexed optical OFDM receiver 300.

The polarization division multiplexed optical OFDM transmitter 100 according to an embodiment of the present invention may be configured as follows. For example, a data demultiplexer (not shown) may divide a transmission signal into a plurality of groups. A training symbol generation unit 160 may allocate a plurality of training symbols for each OFDM data that is included in the respective multiplexed groups, and allocate repetitive data in a time domain for the respective training symbols so that data of 0 can periodically appear for the respective training symbols in a frequency domain. An optical up-converter and polarization division multiplexing unit 180 may perform optical frequency band conversion and polarization division multiplexing on the output of the training symbol generation unit 160 to output a polarization division multiplexed optical OFDM signal corresponding to a plurality of polarization components (for example, x-polarization and y-polarization). The detailed configuration of the polarization division multiplexed optical OFDM transmitter 100 according to an embodiment of the present invention is as follows.

The polarization division multiplexed optical OFDM transmitter 100 may include a data demultiplexer (not shown), serial-to-parallel converters 111 and 115, symbol mapping units 121 and 125, an Inverse Fast Fourier Transform (IFFT) unit 130, a cyclic prefix insertion unit 140, a parallel-to-serial converter 150, a training symbol generation unit 160, digital-to-analog converters 171, 173, 175 and 177 (which are depicted as DAC in FIG. 1), and an optical up-converter and polarization division multiplexing unit 180.

The data demultiplexer demultiplexes a signal to be transmitted into two groups. For example, the each output of the data demultiplexer is used to be multiplexed into two polarization components (for example, x-polarization and y-polarization) within the same bandwidth for increasing the transmission speed of a signal. The serial-to-parallel converters 111 and 115 convert serial data into parallel data on an x-polarization component and a y-polarization component that are demultiplexed by the data demultiplexer, respectively.

The symbol mapping units 121 and 125 perform symbol mapping that modulates the output signals of the serial-to-parallel converters 111 and 115 into a plurality of OFDM subcarriers. The IFFT unit 130 performs IFFT on the plurality of OFDM subcarriers to convert the plurality of OFDM subcarriers into a plurality of signals of a time domain. The cyclic prefix insertion unit 140 inserts a guard interval or a guard time on a time axis into the signals of the time domain that are outputted from the IFFT unit 130. The insertion of the guard interval or guard time may be called Cyclic Prefix (CP) insertion. According to the insertion of guard interval or guard time of the cyclic prefix insertion unit 140, inter-symbol interference by the chromatic dispersion of an optical fiber or polarization mode dispersion decreases. The output signal of the cyclic prefix insertion unit 140 is converted into serial OFDM data through the parallel-to-serial converter 150, and the converted serial OFDM data is provided to the training symbol generation unit 160.

The training symbol generation unit 160 generates training symbols lest an empty space should not exist on a time axis for each polarization component. The training symbol generation unit 160 allocates repetitive data in a time domain for each of the training symbols so that data of 0 can periodically appear in a frequency domain, in generating the training symbols. The training symbol that is generated in the training symbol generation unit 160 is periodically added to a serial type of OFDM data that is provided form the parallel-to-serial converter 150, and is outputted. The configuration of the training symbol that is generated in the training symbol generation unit 160 will be described below with reference to FIGS. 3 to 5.

The output signal of the training symbol generation unit 160 may be configured with training symbols and OFDM data symbols. The OFDM data symbols may be divided into a real number part and an imaginary number part for the respective polarization components. That is, the output signal of the training symbol generation unit 160 may be divided into an output signal corresponding to the real number part of the x-polarization component, an output signal corresponding to the imaginary number part of the x-polarization component, an output signal corresponding to the real number part of the y-polarization component and an output signal corresponding to the imaginary number part of the y-polarization component.

The output signal of the training symbol generation unit 160 is provided to the digital-to-analog converters 171 and 173 and is converted into from a digital data type to an analog data type. In an exemplary embodiment of the present invention, among the output signal of the training symbol generation unit 160, a signal corresponding to the real number and imaginary number parts of the x-polarization component may be converted into an analog signal by the digital-to-analog converters 171 and 173. Among the output signal of the training symbol generation unit 160, a signal corresponding to the real number and imaginary number parts of the y-polarization component may be converted into an analog signal by the digital-to-analog converters 175 and 177. The output signals of the digital-to-analog converters 171, 173, 175 and 177 are provided to the optical up-converter and polarization division multiplexing unit 180.

The optical up-converter and polarization division multiplexing unit 180 up converts the outputs signals of the digital-to-analog converters 171, 173, 175 and 177 from a baseband to an optical frequency band, and performs the polarization division multiplexing of the up-converted result. The output signal of the optical up-converter and polarization division multiplexing unit 180 becomes a polarization division multiplexed optical OFDM signal and is transmitted through a optical fiber 200.

The polarization division multiplexed optical OFDM receiver 300 may be largely configured as follows. For example, a synchronization unit 330 may perform symbol time synchronization and frequency synchronization using a plurality of training symbols that respectively correspond to a plurality of polarization components included in a received polarization division multiplexed optical OFDM signal. A channel estimation and equalization unit 370 may perform channel estimation and signal distortion compensation on the basis of the plurality of training symbols that respectively correspond to the plurality of polarization components. A data multiplexer (not shown) may combine the binary demodulation results of the output of the channel estimation and equalization unit 370 into the original signal. The detailed configuration of the polarization division multiplexed optical OFDM receiver 300 according to an embodiment of the present invention is as follows.

The polarization division multiplexed optical OFDM receiver 300 includes an optical down-converter 310, analog-to-digital converters 321, 323, 325 and 327 (which are depicted as ADC in FIG. 1), a synchronization unit 330, a serial-to-parallel converter 340, a cyclic prefix elimination unit 350, a Fast Fourier Transform (FFT) unit 360, a channel estimation and equalization unit 370, symbol mapping units 381 and 385, parallel-to-serial converters 391 and 395, and data multiplexer (not shown).

The optical down-converter 310 down converts a polarization division multiplexed optical OFDM signal, which is transmitted through the optical fiber 200, into a baseband signal. The analog OFDM signal of a baseband may be divided into a real number part and an imaginary number part for each polarization component. Each of the analog-to-digital converters 321, 323, 325 and 327 divides a baseband signal into the real number and imaginary number parts of the each polarization component, and analog-to-digital converts each signal. In an exemplary embodiment of the present invention, the real number and imaginary number parts of x-polarization component of the baseband signal may be converted into digital signals through the analog-to-digital converters 321 and 323. The real number and imaginary number parts of y-polarization component of the baseband signal may be converted into digital signals through the analog-to-digital converters 325 and 327. The output signals of the analog-to-digital converters 321, 323, 325 and 327 are provided to the synchronization unit 330.

The synchronization unit 330 may perform symbol time synchronization and frequency synchronization in response to the output signals of the analog-to-digital converters 321, 323, 325 and 327. Although described below in detail, training symbols for each of two polarization components (for example, x-polarization and y-polarization) are continuously allocated to the output signals of the analog-to-digital converters 321, 323, 325 and 327. Since data are respectively allocated for the continued training symbols in a time domain, an empty time interval does not exit. As a result, an allowable value by a linear effect is improved, and thus a synchronization operation on the polarization division multiplexed optical OFDM signal can be performed. The synchronization result of the synchronization unit 330 is serial-to-parallel converted through the serial-to-parallel converter 340. The output of the serial-to-parallel converter 340 is provided to the cyclic prefix elimination unit 350. The cyclic prefix elimination unit 350 eliminates cyclic prefix (CP), which is inserted into the guard interval on a time axis of OFDM data, from the output signal of the serial-to-parallel converter 340. CP-eliminated data is converted into the data of a frequency domain through the FFT unit 360. A training symbol, in which data of 0 is periodically generated in the frequency domain, is included in the data of the frequency domain that is provided from the FFT unit 360.

The channel estimation and equalization unit 370 performs an channel estimation operation for estimating channel characteristic and a channel equalization operation for compensating signal distortion on the basis of the output signal of the FFT unit 360, transmitted training symbols and received training symbols. The channel estimation and equalization result of the channel estimation and equalization unit 370 is provided to the symbol mapping units 381 and 385. The symbol mapping units 381 and 385 perform symbol mapping that modulates the output signals of the channel estimation and equalization unit 370 to convert the output signals into binary data. The output signals of the symbol mapping units 381 and 385 are provided to the parallel-to-serial converters 391 and 395. The parallel-to-serial converters 391 and 395 convert the x-polarization components and y-polarization components of the output signals of the symbol mapping units 381 and 385 into serial data, respectively. The serial conversion data for the respective x-polarization component and y-polarization component is restored into the original signal through the data multiplexer (not shown).

Figure 2:
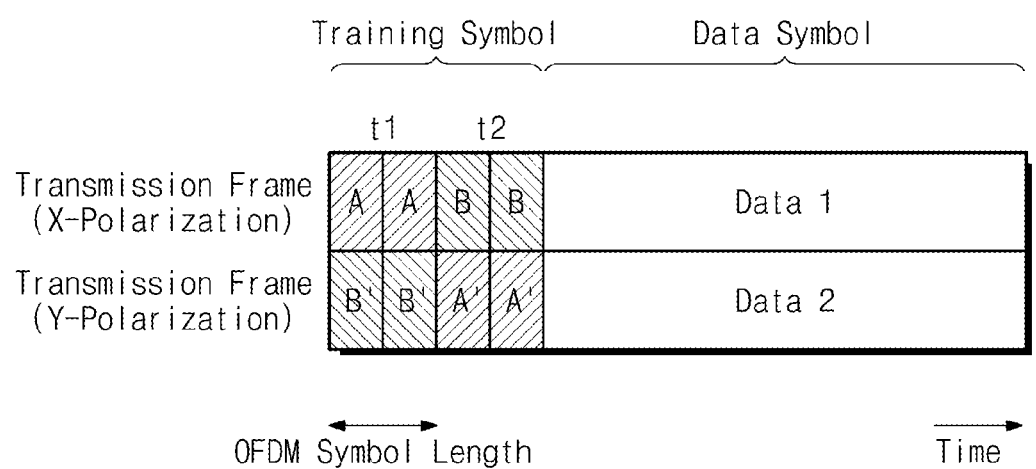
FIG. 2 is a diagram illustrating the structure of a training symbol in a time domain according to an embodiment of the present invention.

FIG. 2 is a diagram illustrating the structure on a time domain of a training symbol according to an embodiment of the present invention. In FIG. 2, the structure in a time domain of an OFDM transmission frame to be transmitted in the polarization division multiplexed optical OFDM transmitter 100 according to an embodiment of the present invention is exemplarily illustrated.

Referring to FIG. 2, an OFDM frame according to an embodiment of the present invention may be independently configured for two multiplexed polarization components (for example, x-polarization and y-polarization), respectively. The x-polarization component and y-polarization component of the OFDM frame may be configured with a plurality of polarization multiplexing training symbols (hereinafter referred to as training symbols) and OFDM data Data1 and Data2, respectively. A plurality of OFDM data symbols may be included in the respective OFDM data Data1 and Data2.

In FIG. 2, two training symbols are included for the respective x-polarization component and y-polarization component of a transmission frame, and a structure "AA, BB, B'B' and A'A'" in which a certain data pattern is repeated twice in a time domain per training symbol is exemplarily illustrated. For example, the x-polarization component of an OFDM transmission frame may include two training symbols and the OFDM data Data1. Two training symbols that are allocated in the same polarization component (for example, x-polarization) may be continuously allocated in a time domain with an empty space. The two continuously-allocated training symbols may be differently configured. The first polarization multiplexing training symbol is transmitted from the polarization division multiplexed optical OFDM transmitter 100 during the first training symbol interval t1. The second polarization multiplexing training symbol is transmitted from the polarization division multiplexed optical OFDM transmitter 100 during the second training symbol interval t2. A polarization division multiplexed optical OFDM frame that is transmitted from the polarization division multiplexed optical OFDM transmitter 100 is provided to the polarization division multiplexed optical OFDM receiver 300 through the optical fiber 200.

When a frequency offset exist in the polarization division multiplexed optical OFDM transmitter 100 and the polarization division multiplexed optical OFDM receiver 300, a signal that is received in the polarization division multiplexed optical OFDM receiver 300 is represented as a signal which is obtained by multiplying a transmission time signal by phase rotation. As a synchronization scheme for solving these limitations, the polarization division multiplexed optical OFDM transmitter 100 may transmit a training symbol having a structure that is repeated in a time domain, and the polarization division multiplexed optical OFDM receiver 300 may calculate and compensate the amount of phase rotation of a received repetitive training symbol. In an embodiment of the present invention, the amount of phase rotation of the received repetitive training symbol may be calculated using the characteristic of a training symbol in which data of 0 periodically appears in a frequency domain. Although described below in detail, a training symbol having a structure that is repeated in a time domain appears periodically as a signal in which data is '0'. Accordingly, in an embodiment of the present invention, the polarization division multiplexed optical OFDM system generates a training signal in which data of 0 periodically appears in a frequency domain, and by applying the training signal to the training symbol, the polarization division multiplexed optical OFDM receiver 300 performs channel estimation and synchronization.

In an exemplary embodiment of the present invention, the first training symbol of the x-polarization component may have a structure in which the data of a pattern A is repeated twice. The second training symbol of the x-polarization component may have a structure in which the data of a pattern B is repeated twice. The number of patterns that are repeated in one training symbol and the number of repetition times may be changed and modified in various forms. For example, when one polarization division multiplexed optical OFDM symbol is configured with eight time samples, the pattern A may have a structure in which four samples are repeated twice like "0.1, −0.03, 0.1, −0.25, 0.1, −0.03, 0.1 and −0.25", and a pattern B may have a value different from the data of the patter A, in a time domain. A training symbol, which is configured with different patterns in the time domain, may also be configured with different patterns in a frequency domain. For example, the data of the pattern A and the data of the pattern B may be configured for data of 0 (see dotted line in FIG. 3) to repeatedly appear in the different locations of the frequency domain.

Alternatively, the y-polarization component of the OFDM transmission frame may include two training symbols and the OFDM data Data2. The OFDM data Data2 may be configured with a plurality of OFDM symbols. The first training symbol of the y-polarization component may have a structure in which the data of the pattern B is repeated twice. The second training symbol of the y-polarization component may have a structure in which the data of the pattern A is repeated twice. That is, two training symbols that are continuously allocated in the y-polarization component may also be differently configured.

A location for carrying data A and A' in a subcarrier is the same, but data that are carried in the subcarrier may be different from each other. A location for carrying data B and B' in a subcarrier is the same, but data that are carried in the subcarrier may be different from each other.

Moreover, training symbols, which will be transmitted in the OFDM frames of different polarizations during the same training symbol interval (for example, t1 or t2), may be differently configured in a time domain. Accordingly, the first training symbol of the x-polarization component and the first training symbol of the y-polarization component to be transmitted during the first training symbol interval t1 may have different values even in a frequency domain. The second training symbol of the x-polarization component and the second training symbol of the y-polarization component to be transmitted during the second training symbol interval t1 may also have different values in a frequency domain. Although described below in detail, training symbols, which will be transmitted in the OFDM frames of different polarizations during the same training symbol interval (for example, t1 or t2), may be configured for data of 0 to appear in the different locations of the frequency domain.

FIG. 3 is a diagram illustrating the structures of training symbols in a frequency domain according to an embodiment of the present invention.

In FIG. 3, the configurations of training symbols in a frequency domain are illustrated according to the order of the training symbol and a polarization component when two training symbols are allocated for each polarization component (for example, x-polarization or y-polarization) and a certain data pattern is repeated twice for each training symbol. A data pattern in FIG. 3 is an example of applying an embodiment of the present invention, and the number of training symbols that may be allocated to each polarization, the number of patterns that may be repeated in the each training symbol and the number of repetition times may be variously changed and modified.

In FIG. 3, an arrow that is depicted as a solid line denotes a subcarrier in which data exists, and an arrow that is depicted as a dotted line denotes a subcarrier corresponding to data of 0.

Referring to FIG. 3, two training symbols that are continuously allocated in the same polarization component may be configured for data (see a solid-line arrow in FIG. 3) to periodically appear in the different subcarrier locations of a frequency domain. For example, the first training symbol of an x-polarization component may be configured for data to periodically appear per the even-numbered subcarrier of the frequency domain. In FIG. 3, such a data pattern is depicted as reference sign A. The second training symbol of the x-polarization component may be configured for data to periodically appear per the odd-numbered subcarrier of the frequency domain. In FIG. 3, such a data pattern is depicted as reference sign B. Moreover, training symbols, which will be transmitted in the OFDM frames of different polarizations during the same training symbol interval (for example, t1 or t2), may be differently configured for data to exist in different locations in the frequency domain.

The channel response characteristic of the polarization division multiplexed optical OFDM receiver 300 for a polarization division multiplexed optical OFDM signal according to an embodiment of the present invention is expressed as Foliation (1).

$$\begin{bmatrix} t'_x(k) \\ t'_y(k) \end{bmatrix} = \begin{bmatrix} a(k) & b(k) \\ c(k) & d(k) \end{bmatrix} \begin{bmatrix} t_x(k) \\ t_y(k) \end{bmatrix} \quad (1)$$

where $t'_x(k)$ represents the reception training symbol of an x-polarization component for the kth subcarrier, $t'_y(k)$ represents the reception training symbol of a y-polarization component for the kth subcarrier. $t_x(k)$ represents the transmission training symbol of an x-polarization component for the kth subcarrier, $t_y(k)$ represents the transmission training symbol of a y-polarization component for the kth subcarrier.

A channel estimation operation that is performed in the polarization division multiplexed optical OFDM receiver 300 means calculating channel matrix elements a(k), b(k), c(k) and d(k) for each subcarrier. Such a channel estimation operation may be performed in the channel estimation and equalization unit 370 in FIG. 1.

As shown in FIG. 3, a case in which the x-polarization component sends a signal to an even-numbered subcarrier and the y-polarization component sends a signal to an odd-numbered subcarrier during the first training symbol interval t1 is expressed as Equation (2).

$$\begin{bmatrix} t'_{1x}(k) \\ t'_{1y}(k) \end{bmatrix} = \begin{bmatrix} a(k) & b(k) \\ c(k) & d(k) \end{bmatrix} \begin{bmatrix} t_{1x}(k_{even}) \\ t_{1y}(k_{odd}) \end{bmatrix} \quad (2)$$

A case in which the x-polarization component sends a signal to an odd-numbered subcarrier and the y-polarization component sends a signal to an even-numbered subcarrier during the second training symbol interval t2 is expressed as Equation (21.

$$\begin{bmatrix} t'_{2x}(k) \\ t'_{2y}(k) \end{bmatrix} = \begin{bmatrix} a(k) & b(k) \\ c(k) & d(k) \end{bmatrix} \begin{bmatrix} t_{2x}(k_{odd}) \\ t_{2y}(k_{even}) \end{bmatrix} \quad (3)$$

Equations (4) and (5) may be obtained from Equation (2), and Equations (6) and (7) may be obtained from Equation (3).

$$t'_{1x}(k_{even}) + t'_{1x}(k_{odd}) = a(k_{even})t_{1x}(k_{even}) + b(k_{odd})t_{1y}(k_{odd}) \quad (4)$$

$$t'_{1y}(k_{even}) + t'_{1y}(k_{odd}) = c(k_{even})t_{1x}(k_{even}) + d(k_{odd})t_{1y}(k_{odd}) \quad (5)$$

$$t'_{2x}(k_{odd}) + t'_{2x}(k_{even}) = a(k_{odd})t_{2x}(k_{odd}) + b(k_{even})t_{2y}(k_{even}) \quad (6)$$

$$t'_{2y}(k_{odd}) + t'_{2y}(k_{even}) = c(k_{odd})t_{2x}(k_{odd}) + d(k_{even})t_{2y}(k_{even}) \quad (7)$$

In this case, a polarization division multiplexed optical OFDM channel matrix may be derived from Equations (4) to (7) and be expressed as Equation (8).

$$\begin{bmatrix} a(k) & b(k) \\ c(k) & d(k) \end{bmatrix} = \begin{bmatrix} \frac{t'_{1x}(k_{even})}{t_{1x}(k_{even})} + \frac{t'_{2x}(k_{odd})}{t_{2x}(k_{odd})} & \frac{t'_{1x}(k_{odd})}{t_{1y}(k_{odd})} + \frac{t'_{2x}(k_{even})}{t_{2y}(k_{even})} \\ \frac{t'_{1y}(k_{even})}{t_{1x}(k_{even})} + \frac{t'_{2y}(k_{odd})}{t_{2x}(k_{odd})} & \frac{t'_{1y}(k_{odd})}{t_{1y}(k_{odd})} + \frac{t'_{2y}(k_{even})}{t_{2y}(k_{even})} \end{bmatrix} \quad (8)$$

A training symbol included in each polarization component, as shown in FIG. 2, may have a repetitive data structure in a time domain. For example, when one polarization division multiplexed optical OFDM symbol is configured with eight time samples, the training symbol may have a structure in which four samples are repeated twice in the time domain like "0.1, −0.03, 0.1, −0.25, 0.1, −0.03, 0.1 and −0.25". Such a structure of the training symbol in the time domain may be used to estimate a frequency offset in the polarization division multiplexed optical OFDM receiver 300.

For example, when the training symbol has a structure that is repeated twice within a symbol period in the time domain, a frequency offset 'ϵ' (i.e., a subcarrier frequency offset/subcarrier channel interval) that is normalized at subcarrier intervals may be expressed as Equation (9).

$$\varepsilon = \frac{D}{2\pi} \arg\left[\sum_{n=0}^{\frac{N}{D}-1} y*[n]y\left[n + \frac{N}{D}\right]\right] \quad (9)$$

where y[n] represents the sample values of a received training sample in a time domain, and D represents the number of repetition times within a symbol period. Therefore, when a symbol is repeated twice, D has a value of 2.

As described above, in the case of the each training symbol of the polarization division multiplexed optical OFDM frame according to an embodiment of the present invention, data may be continuously and repeatedly allocated for all time domains without an empty space in the time domain, and actual data may be exist only in a specific location (for example, an even-numbered location or an odd-numbered location) in a frequency domain. Herein, a location in which actual data exists or a location in which data of 0 exists may be periodically repeated in the frequency domain. The polarization division multiplexed optical OFDM receiver 300 uses the characteristic of the polarization division multiplexed optical OFDM frame in estimating a subcarrier frequency offset.

The configuration of the polarization division multiplexed optical OFDM frame, in which the actual data exists only in a specific location (for example, an even-numbered location or an odd-numbered location) in the frequency domain, may be used to calculate the polarization division multiplexed optical OFDM channel matrix such as Equation (8) and may also be used in synchronization.

Figure 4A:
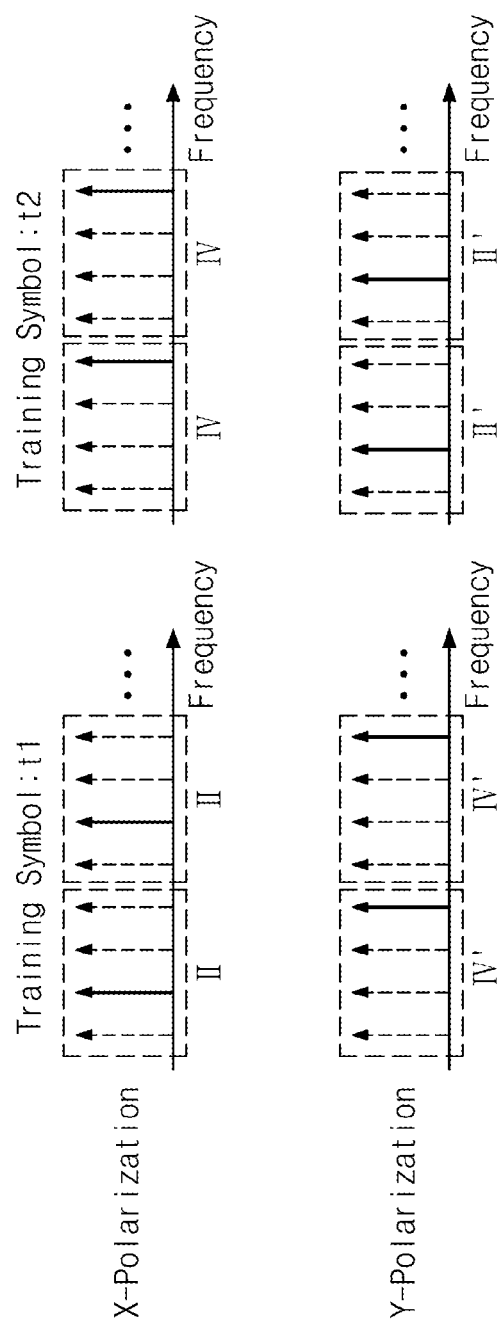

FIGS. 4A and 4B are diagrams illustrating the structures of training symbols in a frequency domain according to another embodiment of the present invention.

In FIGS. 4A and 4B, the configurations of training symbols in a frequency domain are exemplarily illustrated when two training symbols are allocated for each polarization component (for example, x-polarization and y-polarization) and each of the training symbols is repeated four times in a time domain. This is an example of applying an embodiment of the present invention, and the number of training symbols that may be allocated to each polarization, the number of patterns that may be repeated in the each training symbol and the number of repetition times may be variously changed and modified.

Referring first to FIG. 4A, the first training symbol of an x-polarization component may allocate data to the second subcarrier of a frequency domain (see reference sign II in FIG. 4A), and may allocate data at intervals of four subcarriers from the second subcarrier. The second training symbol of the x-polarization component may allocate data to the fourth subcarrier of the frequency domain (see reference sign IV in FIG. 4A), and may allocate data at intervals of four subcarriers from the fourth subcarrier. Data may be allocated at intervals of four subcarriers from the fourth subcarrier. The first training symbol of a y-polarization component may allocate data to the fourth subcarrier of the frequency domain (see reference sign IV' in FIG. 4A), and may allocate data at intervals of four subcarriers from the fourth subcarrier. The second training symbol of the y-polarization component may allocate data to the second subcarrier of the frequency domain (see reference sign II' in FIG. 4A), and may allocate data at intervals of four subcarriers from the second subcarrier. Herein, in the case of the training symbols which will be transmitted in the OFDM frames of different polarizations during the same training symbol interval (for example, t1 or t2), locations in which data exists in the frequency domain may be differently configured.

Referring continuously to FIG. 4B, the training symbol of an x-polarization component and the training symbol of a y-polarization component may allocate data by using the first subcarrier and the third subcarrier instead of the second subcarrier and the fourth subcarrier. Herein, in the case of the training symbols which will be transmitted in the OFDM frames of different polarizations during the same training symbol interval (for example, t1 or t2), locations in which data exists in the frequency domain may be differently configured.

As described above, the data location of the each training symbol of the y-polarization component may be configured not to overlap with the data location of the each train symbol of the x-polarization component to be transmitted/received during the same training symbol interval (for example, t1 or t2), in a frequency domain. A channel matrix for a subcarrier-allcoated frequency may be calculated in a scheme similar to Equations (2) to (8). A channel matrix for a subcarrier-unallocated frequency may be calculated through an interpolation from a subcarrier-allocated frequency.

FIGS. 4A and 4B illustrate a case in which at least two of four data patterns (for example, reference signs I to IV or I' to IV') may be selectively applied for a training symbol that is allocated to each polarization component. According to this configuration, since data patterns capable of being applied for the training symbols are not applied at one time, efficiency for channel estimation can be improved.

Although the locations of subcarriers in which data I and I', data II and II', data III and III' and data N and N' are carried are identical, data which are carried in the subcarriers may be different.

Figure 5:
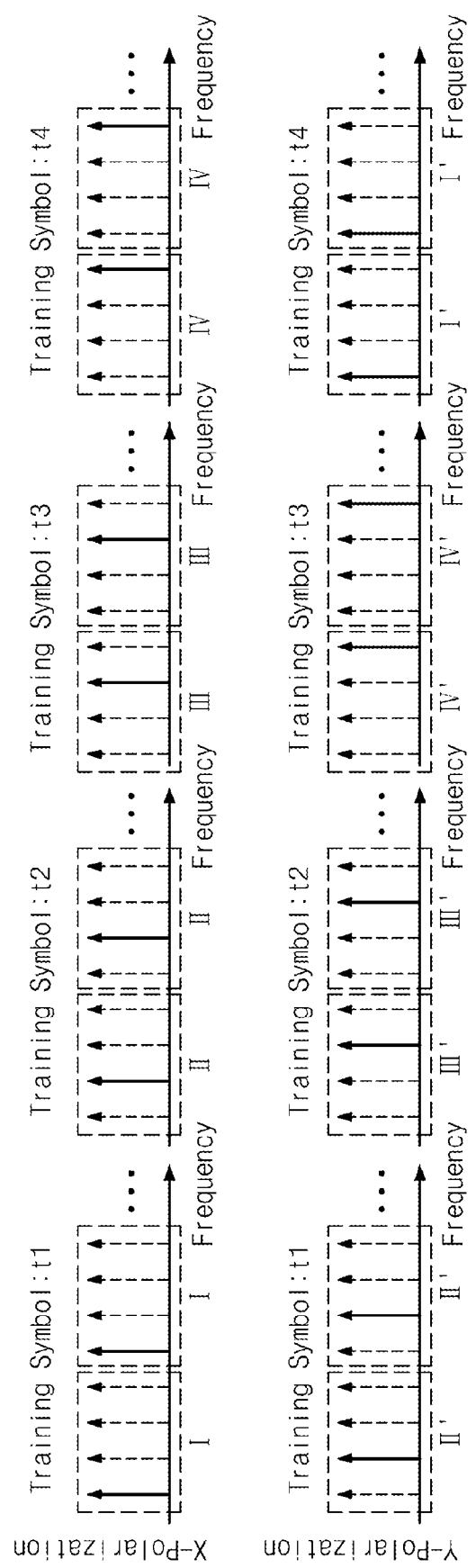
FIG. 5 is a diagram illustrating the structures of training symbols in a frequency domain according to another embodiment of the present invention.

FIG. 5 is a diagram illustrating the structures of training symbols in a frequency domain according to another embodiment of the present invention.

In FIG. 5, the configurations of training symbols in a frequency domain are exemplarily illustrated when four training symbols are allocated for each polarization component (for example, x-polarization and y-polarization) and each of the training symbols is repeated four times in a time domain.

However, this is an example of applying another embodiment of the present invention, and the number of training symbols that may be allocated to each polarization, the number of patterns that may be repeated in the each training symbol and the number of repetition times may be variously changed and modified. For example, if the number of patterns to be repeated in the time domain of each training symbol is defined, the subcarriers may be allocated at intervals equal to the number of patterns that are repeated in the frequency domain.

FIG. 5 has difference with respect to FIGS. 4A and 4B in that it uses all of four data patterns (reference signs I to IV or IV') for four training symbols that are allocated to respective polarization components. Because a frame structure in FIG. 5 uses all configurable training symbols, obtaining a channel matrix from all subcarriers without an interpolation.

As described above, the polarization division multiplexed optical OFDM transmitter according to embodiments of the present invention can allocate continuous training symbols for each of two multiplexed polarization components (for example, x-polarization and y-polarization). The polarization division multiplexed optical OFDM transmitter allocates data for each of continuous training symbols in a time domain, eliminating an empty time interval. As a result, power difference between adjacent training symbols decreases and thus an allowable value by a nonlinear effect can be improved, performing effective synchronization. Moreover, the polarization division multiplexed optical OFDM transmitter configures a polarization multiplexing training symbol by using characteristic in which data of 0 appears repeatedly and periodically in the frequency domain in the case of a training symbol of a structure that is repeated in the time domain. Accordingly, the polarization division multiplexed optical OFDM transmitter can channel estimation and synchronization using a polarization multiplexing training symbol according to embodiments of the present invention.

According to embodiments of the present invention, the polarization division multiplexed optical OFDM transmitter can generate the polarization division multiplexed optical OFDM training symbol in order for data of 0 to periodically appear in a frequency domain. Furthermore, the polarization division multiplexed optical OFDM receiver can perform both channel estimation and synchronization for each polarization by using the polarization division multiplexed optical OFDM training symbol.

According to embodiments of the present invention, the training symbol exists across all the points in time within the time domain (i e, because a empty space does not exit in the training symbol within the time domain). Accordingly, power difference between the adjacent training symbols of the polarization division multiplexed optical OFDM signal that is transmitted/received in the polarization division multiplexed optical OFDM transmitter and receiver is reduced, and thus the allowable value by a nonlinear effect can be improved.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A polarization division multiplexed optical Orthogonal Frequency Division Multiplexing (OFDM) transmitter, comprising:

a data demultiplexer dividing a transmission signal into a plurality of groups;

a training symbol generation unit allocating a plurality of training symbols for each OFDM data which is comprised in the respective multiplexed groups, and allocating repetitive data in a time domain for the respective training symbols for data of 0 to periodically appear for the respective training symbols in a frequency domain; and an optical up-converter and polarization division multiplexing unit performing optical frequency band conversion and polarization division multiplexing on an output of the training symbol generation unit to output a polarization division multiplexed optical OFDM signal corresponding to a plurality of polarization components.

2. The polarization division multiplexed optical OFDM transmitter of claim 1, wherein the training symbol generation unit allocates at least two training symbols for each OFDM data which is respectively comprised in first and second groups, and allocates data to subcarriers in different locations of the at least two allocated training symbols.

3. The polarization division multiplexed optical OFDM transmitter of claim 2, wherein the training symbol generation unit allocates first and second training symbols to the respective OFDM data of the first group, allocates third and fourth training symbols to the respective OFDM data of the second group, allocates first data to the same subcarrier location of the first and third training symbols, and allocates second data to the same subcarrier location of the second and fourth training symbols.

4. The polarization division multiplexed optical OFDM transmitter of claim 3, wherein the first data differs from the second data.

5. The polarization division multiplexed optical OFDM transmitter of claim 1, wherein the training symbol generation unit allocates the plurality of training symbols for an empty space not to exist on a time axis for each of the multiplexed groups.

6. A polarization division multiplexed optical Orthogonal Frequency Division Multiplexing (OFDM) receiver, comprising:

a synchronization unit performing symbol time synchronization and frequency synchronization using a plurality of training symbols, the plurality of training symbols respectively corresponding to a plurality of polarization components comprised in a received polarization division multiplexed optical OFDM signal, and each including a signal for which 0 periodically appears in a frequency domain;

a channel estimation and equalization unit performing channel estimation and signal distortion compensation on the basis of the plurality of training symbols which respectively correspond to the plurality of polarization components; and a data multiplexer combining binary demodulation results of an output of the channel estimation and equalization unit into an original signal.

7. The polarization division multiplexed optical OFDM receiver of claim 6, wherein the plurality of training symbols are continuously allocated in a time domain for each of the plurality of polarization components of the received polarization division multiplexed optical OFDM signal.

8. A polarization division multiplexed optical Orthogonal Frequency Division Multiplexing (OFDM) receiving method, comprising:

receiving and down-converting a polarization division multiplexed optical OFDM signal;

dividing each of a plurality of polarization components of the polarization division multiplexed optical OFDM signal into real and imaginary number parts, and analog-to-digital (AD) converting the real and imaginary number parts;

performing symbol time synchronization and frequency synchronization on the AD converted parts using a plurality of training symbols, the plurality of training symbols respectively corresponding to the plurality of polarization components of the received polarization division multiplexed optical OFDM signal, and each including a signal for which 0 periodically appears in a frequency domain;

subsequently performing channel estimation, signal distortion compensation and symbol mapping on the basis of the plurality of training symbols to thereby generate binary demodulation results; and combining the binary demodulation results to generate an original signal.

9. The polarization division multiplexed optical OFDM receiving method of claim 8, wherein the plurality of training symbols are continuously allocated in a time domain for each of the plurality of polarization components of the received polarization division multiplexed optical OFDM signal.

* * * * *